United States Patent [19]

Cowgill et al.

[11] Patent Number: 5,551,177

[45] Date of Patent: Sep. 3, 1996

[54] ROLL-UP SIGN WITH COLLAPSIBLE, FANNING FRAMEWORK

[75] Inventors: John H. Cowgill, Otis; Charles W. Elroy, Jr., Depoe Bay, both of Oreg.

[73] Assignee: Sportniks, Inc., Depoe Bay, Oreg.

[21] Appl. No.: 337,896

[22] Filed: Nov. 14, 1994

Related U.S. Application Data

[63] Continuation-in-part of Ser. No. 252,232, Jun. 1, 1994.

[51] Int. Cl.$^6$ .................................................. G09F 21/02
[52] U.S. Cl. ............................ 40/610; 40/586; 116/63 P
[58] Field of Search ........................ 40/610, 586, 612; 404/6, 9, 10; 116/173, 63 P

[56] References Cited

U.S. PATENT DOCUMENTS

| | | | |
|---|---|---|---|
| 403,698 | 5/1889 | Rector | 40/586 |
| 2,732,823 | 1/1956 | Hanson | 116/173 |
| 2,819,547 | 1/1958 | Clements, Jr. | 40/612 |
| 3,526,200 | 9/1970 | Doyle | 116/173 X |
| 3,775,887 | 12/1973 | Precourt . | |
| 3,800,730 | 4/1974 | Taylor . | |
| 3,847,335 | 11/1974 | Ross . | |
| 4,071,969 | 2/1978 | Tonhauser | 40/610 |
| 4,103,445 | 8/1978 | Smith et al. . | |
| 4,152,854 | 5/1979 | Berry, Jr. et al. | 40/610 |
| 4,209,927 | 7/1980 | Donatelle | 40/607 |
| 4,490,934 | 1/1985 | Knapp | 40/610 X |
| 4,541,190 | 9/1985 | Weiner et al. | 40/610 |
| 4,619,220 | 10/1986 | Seely et al. | 116/173 X |
| 4,792,258 | 12/1988 | Goff | 404/6 |
| 4,817,319 | 4/1989 | Vitale | 40/610 |
| 4,866,866 | 9/1989 | Rotter et al. | 40/610 |
| 4,875,302 | 10/1989 | Noffsiger | 40/610 |
| 4,876,811 | 10/1989 | Peltz | 40/586 |
| 4,980,984 | 1/1991 | Kulp et al. | 40/610 |
| 4,982,683 | 1/1991 | Earnest, Jr. | 116/63 P |
| 4,986,016 | 1/1991 | Wichman | 40/610 |
| 5,001,455 | 3/1991 | Starchevich . | |
| 5,003,716 | 4/1991 | Dyar | 40/503 |
| 5,115,623 | 3/1992 | Ahlberg . | |
| 5,125,205 | 6/1992 | Wichman . | |
| 5,152,091 | 10/1992 | Leach | 40/610 X |
| 5,175,646 | 12/1992 | Eden | 40/610 X |
| 5,231,778 | 8/1993 | Belobraydich et al. | 40/610 |

*Primary Examiner*—Joanne Silbermann
*Attorney, Agent, or Firm*—Robert D. Varitz, Esq

[57] ABSTRACT

The sign includes a frame having a hub and plural arms extending therefrom. A web is disposed over the frame and may be secured thereto. A support for the sign is attached to at least one of the arms of the frame. The web may be either fully-attached to the frame, may be partially attached thereto, or may be removable from the frame. The web may include some type of reflective device or some type of illuminated device for further calling attention to the sign. The sign web is two-sided, and may contain lettering or other indicia on either one or both sides thereof.

9 Claims, 2 Drawing Sheets

ROLL-UP SIGN WITH COLLAPSIBLE, FANNING FRAMEWORK

RELATED APPLICATION

This is a Continuation-in-Part of U.S. patent application Ser. No. 08/252,232, filed Jun. 1, 1994.

TECHNICAL FIELD

This invention relates to signs and more particularly to a sign which has a frame with a web disposed there over which may be collapsed and rolled up for easy storage and transportation.

BACKGROUND ART

Temporary signs are in use worldwide. Such signs are used to provide direction for traffic, to provide notice that property is for sale or lease, or to provide any other type of information to the passer by. Because of the temporary nature of such signs, it is necessary that they be transportable with a minimum amount of effort and inconvenience. To this end, a large variety of collapsible and/or folding signs have been developed.

In the field of highway signs, one such sign is disclosed in U.S. Pat. No. 5,152,091 to Leach. This sign utilizes a single-sided fabric web over a metal frame having a pair of arms which are pivoted at their midpoints. Once the arms are extended, the fabric web is stretched over the frame and secured to the ends of the arms. This sign is then placed in a stand which provides support therefor.

Ross, U.S. Pat. No. 3,847,335 discloses a folding portable sign standard which again has a pair of mutually-pivoting supports for the sign and a base, all of which may be folded into a relatively compact structure suitable for transportation and storage.

U.S. Pat. No. 4,541,190 to Weiner et al discloses a folding sign which may have a variety of messages or instructions printed thereon, and which folds to a compact state for storage and transportation.

Culp et al, U.S. Pat. No. 4,980,984 discloses yet another type of sign which may have its framework folded up and encased within the message-bearing web for transportation and storage.

Other forms of collapsible signs are disclosed in U.S. Pat. No. 4,875,302 to Knoffsigner, which discloses a foldable frame and a web stretched there over, wherein the web forms a backing to which a sign may be attached.

U.S. Pat. No. 4,817,319 to Vitale and No. 4,866,866 to Rotter et al both disclose signs which may be collapsed and which may be sunk into the ground to provide various types of notices.

Another type of sign that is frequently seen along the highways is the STOP/SLOW sign used by highway workers to control traffic through a construction area. Such a sign is typically nothing more than a conventional metal 18- or 24-inch wide octagonal "STOP" sign, as is used at fixed stop sign locations, with a "SLOW" warning on the reverse side thereof. The sign may be turned side-for-side depending on whether the highway worker desires oncoming traffic to stop or to merely proceed at a slower pace. Such signs generally have a handle thereon which is grasped by the highway worker, or may be mounted on a pole which is rested on the ground. As may be expected, such a sign is usually quite heavy, particularly if it is required to be held for some time by a highway worker.

One of the problems associated with temporary signs occurs during inclement weather conditions, particularly during high winds. Temporary signs will often be rotated or knocked over by the wind, or, if the flexible web over a temporary sign is not properly supported, the web will billow, thereby producing an air foil which further aggravates the problem which may cause the sign to "kite."

One of the disadvantages of known collapsible signs is that the web is generally detached from the sign for storage purposes. Thus; the web over the sign is constantly being removed and applied to the framework, thereby causing wear on the web and inconvenience to the workers who are placing the sign, as additional steps are required in order to ready the sign for use. Such signs may have removable pieces, which may become separated from the rest of the sign, which may result in the sign becoming inoperable. Some of the embodiments disclosed herein include a two-side web which is permanently attached to a collapsible frame, so as to keep all of the pieces of the sign together. Other embodiments allow for removal of part or all of the frame from the web, as may be suited for particular applications.

DISCLOSURE OF THE INVENTION

The sign of the invention includes a frame having a hub and plural arms extending therefrom. A web is disposed over the frame. A support for the sign is attached to at least one of the arms of the frame. The web may be partially attached to the frame, or may be removable therefrom. The web may include some type of reflective device or some type of illuminated device for further calling attention to the sign. The sign web is two-sided, and may contain lettering or other indicia on either one or both sides thereof.

It is an object of the invention to provide a sign which may be easily collapsed, as by rolling it up for storage and transportation.

Another object of the invention is to provide a sign which is lightweight and easily handled by a worker.

A further object of the invention is to provide a sign which includes a web disposed over a collapsible frame, wherein the web may be permanently secured to the frame, at least over a portion of its expanse.

Yet another object of the invention is to provide a sign wherein the web may be removed from the frame.

These and other objects and advantages of the invention will become more fully appreciated as the description which follows is read in connection with the drawings.

BEST MODE FOR CARRYING OUT THE INVENTION

Figures 1, 2, 3:
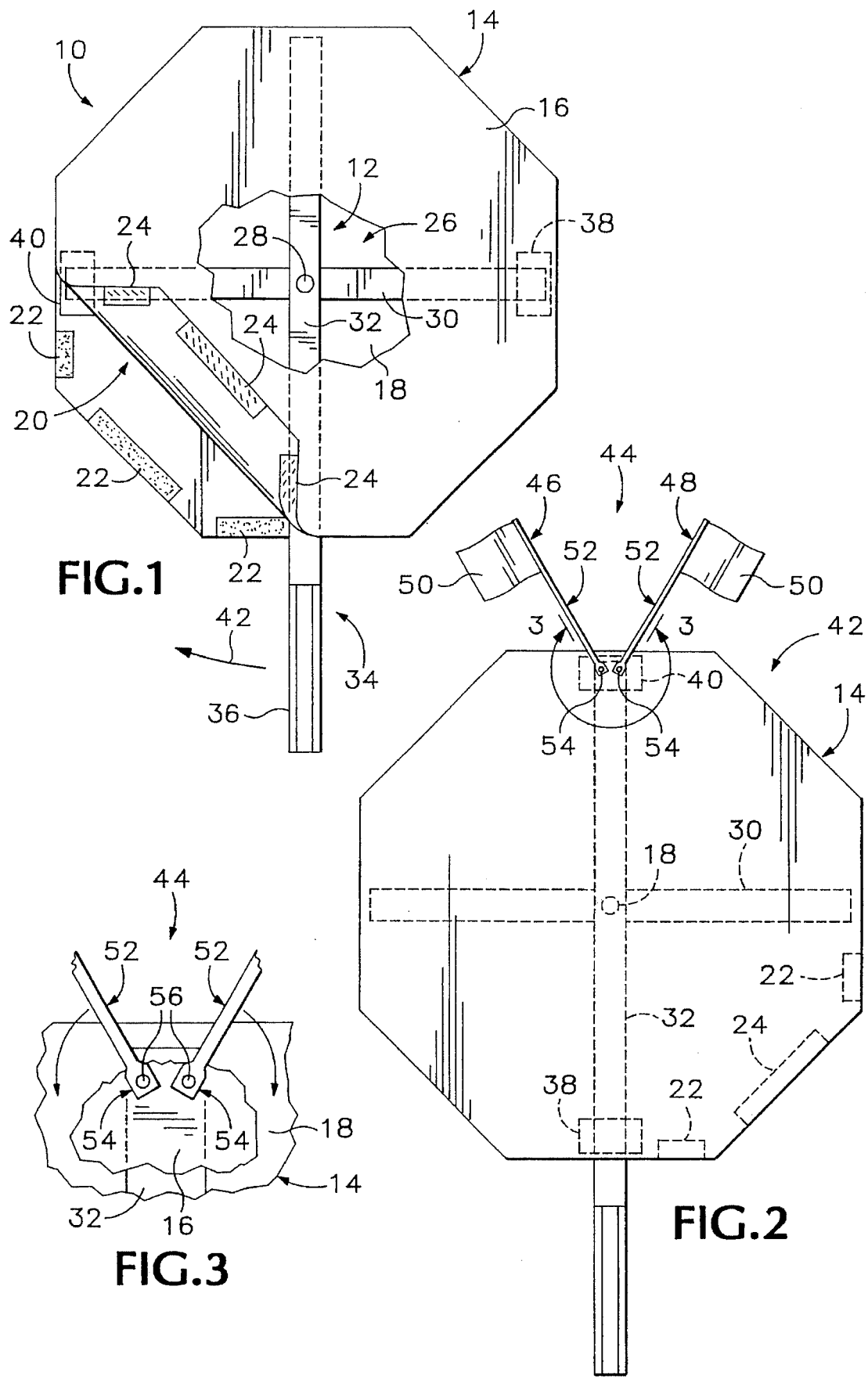
FIG. 1 is a front elevation of a sign constructed according to the invention.
FIG. 2 is an alternate embodiment of the sign of FIG. 1, having auxiliary attention-attracting devices attached thereto.
FIG. 3 is an enlarged depiction of the mounting for the auxiliary attention-attracting device.

Turning initially to FIG. 1, a sign constructed according to the invention is depicted generally at 10. Sign 10 includes a frame 12 having a web 14 disposed thereover.

Web 14 includes sides 16 and 18 which are, in the preferred embodiment, joined together along a majority of the periphery 19 thereof, as by stitching, bonding or adhesive. Sides 16 and 18 form a pocket 20 therebetween. Frame 12 is enclosed within pocket 20. Frame 12 may be secured to web 14, or the sign may be constructed to allow removal of the frame, or a part thereof, from the web pocket 20, so that the web may be rolled up in a more compact configuration. It should be appreciated that the principle goal of the invention is to provide a sign which may be rolled up. This may be accomplished by providing a frame have a collapsing mechanism, such as is disclosed herein and in U.S. patent application Ser. No. 08/252,232, filed Jun. 1, 1994, for SIGN WITH COLLAPSIBLE, FANNING FRAMEWORK, which is incorporated herein by reference, or by providing a frame and web combination wherein the frame may be removed from the web.

The material forming the sides of web 14 may be reflective, and may contain indicia or lettering thereon such as the familiar "STOP" notation, which would be notated on one side of sign 10, and which would have the conventional white letters on a red background, while the other side of the web may be provided with an orange background and black letters for the word "SLOW". The fabric of the web may be reflective. One material which has been found to be particularly suited for the web is a 3-M® product, identified by product nos. 8986 and 8987, which is Scotch-lite™ reflective fabric in red-orange, and lime-yellow, respectively. The 3-M® product has reflective, wide-angle lenses bonded to a cloth backing. The colors are conspicuous under daylight conditions and are exceptionally reflective at night. The fabric has reflectivity values of approximately 175 foot candles per square foot of material. Another 3-M® which is identified as Scotch-lite™ reflective fabric 8960, in white, is also suitable, particularly for providing lettering on signs constructed according to the invention. This product provides a reflectivity of 70–100 foot candles per square foot of fabric. The fabric selected for web 14 is a non-electrically conductive material, and is light weight.

As previously noted, web 14 includes pocket 20 therein. As depicted in FIG. 1, pocket 20 is open along approximately one-quarter of the periphery 19 of the web, and includes fasteners, such as hook-and-loop fasteners, shown at 22, 24, respectively, which may be used to close that portion of the periphery of web 14 where the sides 16, 18 are not joined to one another. Other types of suitable fasteners, such as snaps, may also be used.

Frame 12, in this embodiment, includes a hub 26 which has a pivot point 28 located in the center thereof. Pivot point 28 provides a hinge element between plural, elongate arms of the frame, which are shown at 30 and 32. Arms 30 and 32 are seen to radiate from hub 26, which pivotally joins arms 30, 32 intermediate their ends.

A support 34 is attached to arm 32 in this embodiment and includes a handle 36. Handle 36 provides a comfortable grip for a worker who may hold the sign to direct traffic. Handle 36 may be a two-piece assembly, which is joined to arm 32, as by rivets or adhesive, or may be a cylindrical unit which has a receiver for arm 32 so that the arm may fit into the handle proper. Other manners of attaching handle 36 to arm 32 will be well known to those of ordinary skill in the art.

Handle 36 also may be conformably joined with a pole which will allow the worker to rest the sign on the ground, which is a general concern with conventional signs, that have significant weight and which become burdensome over the course of a working shift. Support 34 may also be attached to a ground-based stand for holding the larger, free-standing versions of the sign.

Arms 30 and 32 may be formed of lightweight metal, such as aluminum, or of a plastomer material. The use of a plastomer material in frame 12, along with the web 14 material, makes the sign virtually electrically-conductive-material free, which is a significant safety factor for workers who may have to control traffic in stormy weather.

As depicted in FIG. 1, arm 30 is joined at its ends to the fabric of side 18 at 38 and 40. Such joining may be a permanent joining, as by adhesive or stitching, or may be a temporary joining, as by removable fasteners, such as hook-and-loop or snap fasteners. Arm 32 may be pivoted relative to arm 30, in the direction indicated by arrow 42, which would allow arm 32 to overlay arm and which would then allow the sign to be rolled up. In the case of a sign having a deployed width of 18 inches, such a sign may be rolled into a cylindrical configuration having a diameter of approximately three inches. The rolled sign may then be placed in a carrying case or other suitable container when it is not needed.

Turning now to FIG. 2, a sign 42 is depicted. Sign 42 is constructed similarly to sign 10, with the exception that arm 32 is fixed relative to web 14 while arm 30 is allowed to pivot about pivot point 28. This configuration is desirable when an auxiliary attention-attracting device 44 is provided with the sign. Device 44 includes warning flags 46 and 48, each of which include a flag element 50, a flag pole element 52 and a flag pole fastener 54 which is operable to secure the flag pole element to the sign.

A portion of device 44 is depicted in an enlarged scale in FIG. 3. In this embodiment, fastener 54 includes a pivotal mounting 56 for flag pole element 52. Pivotal mounting 56 is constructed and arranged to allow pivoting of the warning flags relative to frame 12, and may include a rivet fastener that is sufficiently loose to allow rotation of mounting 56 relative to frame 12.

Figure 4:
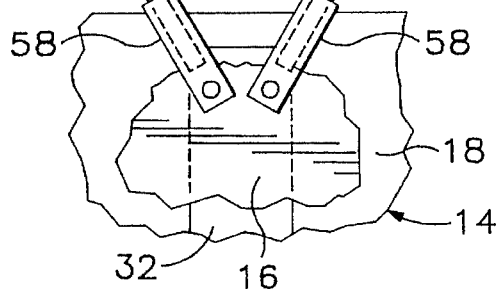
FIG. 4 is an enlarged depiction of an alternate embodiment of the mounting for the auxiliary attention-attracting device.

Turning now to FIG. 4, mountings 58 are provided and are constructed and arranged to allow insertion and removal of flag pole element 52. In the case of the embodiment of device 44 depicted in FIG. 3, the warning flags are permanently attached to the sign and are folded down to align with arm 32 prior to collapsing the sign and rolling it up. In the case of the embodiment of device 44 depicted in FIG. 4, the warning flags are removed and may be rolled up with the sign in order to maintain the warning flags in proximity to the sign.

Figure 5:
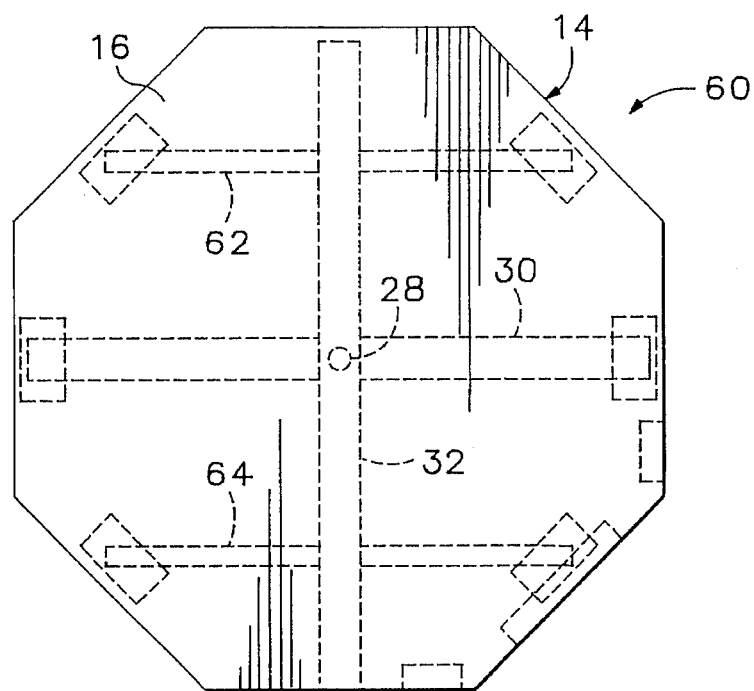
FIG. 5 is a modified embodiment of the sign of FIG. 1.

Turning now to FIG. 5, a modified sign is depicted at 60. Sign 60 is constructed similarly to sign 10 in that arm 30 is fixed to web 14 and arm 32 is allowed to pivot. Additionally, struts 62 and 64 are provided, and are fixed to web 14 inside of pocket 20. Struts 62, 64 provide more rigidity to web 14 than in the case of signs 10 and 42, and is believed to be more suited in the instances where winds are a factor in maintaining the sign in its deployed configuration. Under most circumstances, however, the material which is used to construct web 14 is of sufficient rigidity to provide the sign in a deployed condition and to be self supporting to maintain the sign in its depicted configuration.

Another configuration of the sign of the invention includes a frame having separable arms, which includes a horizontal arm which is fixed to the web, and an arm-handle element which is slidably, removably received on the horizontal arm, on the frame hub, in a vertical orientation. This configuration allows the arm-handle element to be removed from the sign, overlaid on the horizontal arm, and then allows the sign to be rolled-up about the arms.

Figure 6:
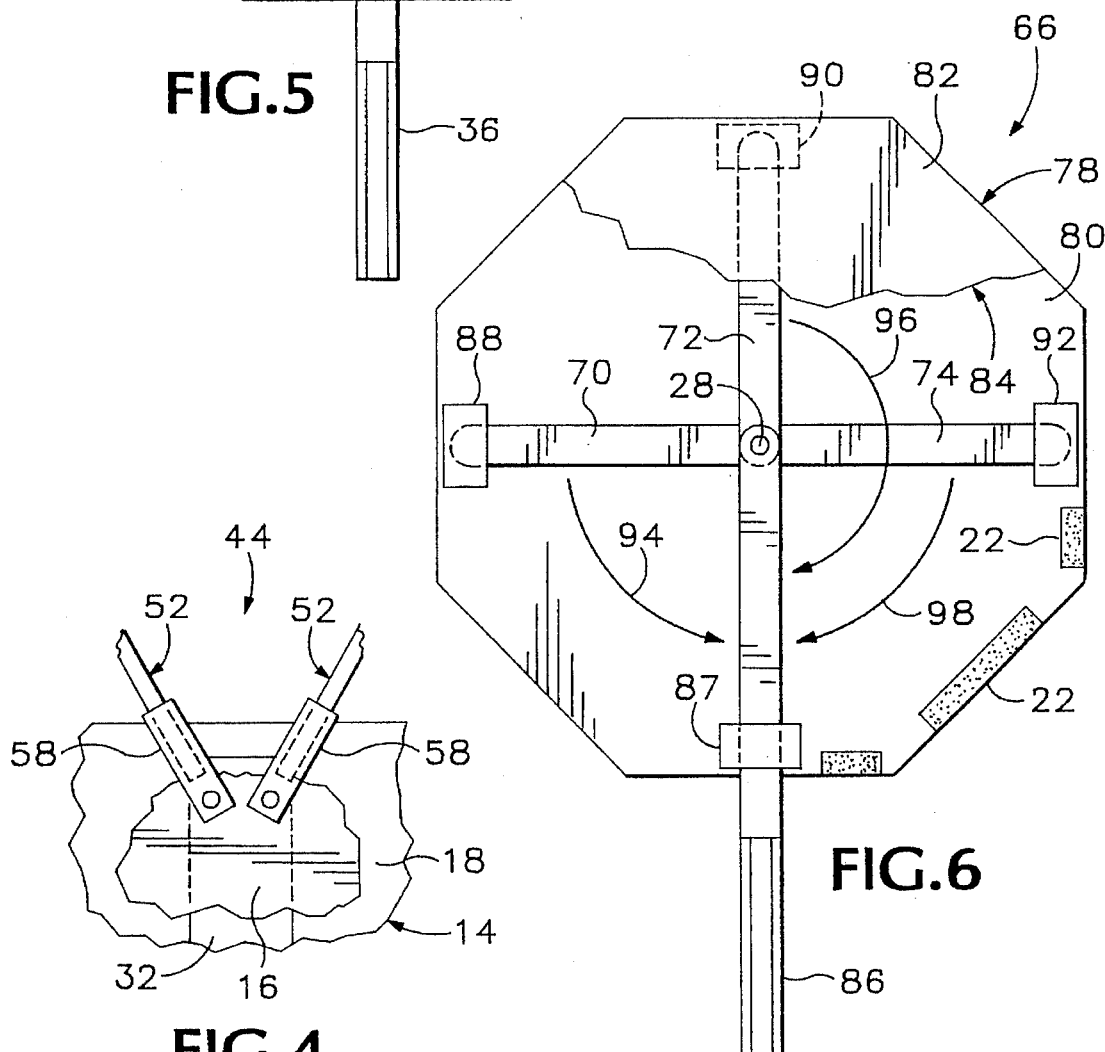
FIG. 6 is another modified embodiment of the sign of FIG. 1.

Referring now to FIG. 6, a sign 66 is depicted, which includes a frame 68, having arms 70, 72, 74 and 76, and a web 78, having sides 80, 82, which form a pocket 84 therebetween. Arms 70, 72, 74 and 76 are joined at hub 26, having a pivot point 28. In this embodiment, handle 86 is attached to arm 76, and arm 76 is permanently attached to a side of web 78 at attachment point 87. Arm receivers 88, 90 and 92 are provided to receive the free ends of arms 70, 72 and 74, respectively. When it is desired to collapse sign 66, arms 70, 72 and 74 are rotated as indicated by arrows 94, 96 and 98, respectively, to align with arm 76. The top portion of web 78 may then be folded over the bottom portion, and the sign rolled up. The advantage of this embodiment is that the overall length of the collapsed sign is shorter, by approximately one-third, that the previously described embodiments of the sign. Although such shortening may not be a significant factor in the hand-held embodiment of the signs of the invention, the disclosed structure is also suitable for free-standing, road-side signs, which may be four to ten feet across. The collapsed length of the road-side signs may be significant in terms of storage and transport. In the case of a hand-held sign, a folding handle may be provided, which will further shorten the collapsed length.

Although a number of embodiments of the invention have been described herein, it should be appreciated that yet further modifications may be made thereto without departing from the scope of the invention as defined in the appended claims.

INDUSTRIAL APPLICABILITY

The signs of the invention are particularly well suited for warning signs to be used in connection with highway construction. Additionally, the signs of the invention are particularly well suited where any temporary sign is required.

We claim:

1. A sign (10) comprising:

a frame (12) having a pivot point (28) and plural, elongate arms (30,32), wherein said arms are pivotally joined to one another adjacent their middle at said pivot point;

a web (14) disposed over said frame (12), wherein said web includes a pair of co-extensive sides (16, 18) having a pocket (20) formed between said sides, and wherein said frame (12) is at least partially received in said pocket (20), and said web is secured to one of said arms, and another of said arms is free to rotate within said pocket; and a support (34) for the sign which is attached at the end of one of said arms.

2. The sign of claim 1 wherein said support (34) includes a handle (36) which is attached to one of said arms.

3. The sign of claim 1 which includes an auxiliary attention-attracting device (44) having a warning flag (46, 48) attached to the sign, wherein said warning flag include a flag element, (50) a flag pole element (52) for supporting said flag element, and a flag pole fastener (54) for securing said flag pole element to the sign.

4. The sign of claim 3 wherein said flag pole fastener (54) includes a mounting (58) for receiving a flag pole element (52), wherein said mounting is constructed and arranged to allow insertion and removal of said flag pole element.

5. The sign of claim 3 wherein said flag pole fastener (54) includes a pivotal mounting (56) for said flag pole element, wherein said mounting is constructed and arranged to allow pivoting of said warning flag (46, 48) relative to said frame.

6. A roll-up sign (10) having:

a frame (12) having plural, elongate arms (30, 32), wherein said arms are pivotally joined to each other adjacent the centers thereof;

a web (14) disposed over said frame (12) and secured to one of said arms, wherein said web includes a pair of co-extensive sides (16, 18), which are joined together about a majority of their periphery (19), thereby forming a pocket (20) between said sides, wherein said frame (12) is at least partially received in said pocket (20) and wherein another of said arms is free to rotate within said pocket; and a handle (36), for supporting the sign, attached to said frame (12) at the end of one of said arms.

7. The sign of claim 6 which includes an auxiliary attention-attracting devices (44) having a warning flag (46, 48) attached to the sign, wherein said warning flag includes a flag element (50), a flag pole element (52) for supporting said flag element (50), and a flag pole fastener (54) for securing said flag pole to the sign.

8. The sign of claim 7 wherein said flag pole fastener (54) includes a mounting (58) for receiving a flag pole element (52), and which is constructed and arranged to allow insertion and removal of said flag pole element.

9. The sign of claim 7 wherein said flag pole fastener (54) includes a pivotal mounting (56) for said flag pole element, wherein said mounting is constructed and arranged to allow pivoting of said warning flag (46, 48) relative to said frame.

* * * * *